US012623352B2

(12) United States Patent
    Ledenkov et al.

(10) Patent No.: US 12,623,352 B2
(45) Date of Patent: May 12, 2026

(54) AUTOMATIC MASSAGE METHOD

(71) Applicants: Denis Ledenkov, Dubai (AE); Maxim Gladilov, Dubai (AE)

(72) Inventors: Denis Ledenkov, Dubai (AE); Maxim Gladilov, Dubai (AE)

( * ) Notice: Subject to any disclaimer, the term of this patent is extended or adjusted under 35 U.S.C. 154(b) by 102 days.

(21) Appl. No.: 18/219,264

(22) Filed: Jul. 7, 2023

(65) Prior Publication Data

US 2025/0010486 A1     Jan. 9, 2025

(51) Int. Cl.
    *B25J 11/00* (2006.01)
    *B25J 9/16* (2006.01)
    *B25J 19/02* (2006.01)
(52) U.S. Cl.
    CPC ........... *B25J 11/008* (2013.01); *B25J 9/1664* (2013.01); *B25J 19/023* (2013.01)
(58) Field of Classification Search
    CPC ....... B25J 11/008; B25J 9/1664; B25J 19/023
    See application file for complete search history.

(56) References Cited

U.S. PATENT DOCUMENTS

| | | | | | |
|---|---|---|---|---|---|
| 10,434,658 | B2 * | 10/2019 | Gu | ..................... | B25J 11/0005 |
| 11,197,799 | B2 * | 12/2021 | Tian | ...................... | A61H 39/02 |
| 11,475,630 | B2 * | 10/2022 | Tian | ..................... | A61B 5/0816 |
| 11,858,144 | B2 * | 1/2024 | Litman | ................... | B25J 13/08 |
| 12,083,050 | B1 * | 9/2024 | Akiona | ................ | A61G 13/121 |
| 12,122,050 | B2 * | 10/2024 | Litman | ................. | G16H 50/20 |

| | | | | | |
|---|---|---|---|---|---|
| 2017/0266077 | A1 * | 9/2017 | Mackin | .............. | A61G 13/1235 |
| 2019/0160684 | A1 * | 5/2019 | Gu | .......................... | B25J 13/087 |
| 2020/0121556 | A1 * | 4/2020 | Tian | ...................... | A61H 39/02 |
| 2020/0126297 | A1 * | 4/2020 | Tian | ....................... | G06T 7/0012 |
| 2021/0154852 | A1 * | 5/2021 | Eyssautier | .......... | G05B 19/401 |
| 2022/0134551 | A1 * | 5/2022 | Litman | .................. | B25J 9/1633 |
| | | | | | 700/260 |
| 2022/0184808 | A1 * | 6/2022 | Zheng | .................... | B25J 9/1666 |
| 2022/0234210 | A1 * | 7/2022 | Inada | .................... | B25J 9/1679 |
| 2022/0379469 | A1 * | 12/2022 | Zeng | ..................... | B25J 9/1633 |
| 2023/0414430 | A1 * | 12/2023 | Godlasky | .............. | A61G 13/08 |
| 2024/0016691 | A1 * | 1/2024 | Sanchez Jimenez | ...................... A61H 9/0071 |
| 2024/0307251 | A1 * | 9/2024 | Litman | .................. | B25J 9/0084 |
| 2025/0010486 | A1 * | 1/2025 | Ledenkov | ............. | B25J 11/008 |
| 2025/0083314 | A1 * | 3/2025 | Litman | .................. | B25J 9/1633 |

(Continued)

*Primary Examiner* — Thomas E Worden
*Assistant Examiner* — Madison B Emmett
(74) *Attorney, Agent, or Firm* — Bardmesser Law Group

(57)                ABSTRACT

The invention relates to an automatic massage method and device. A massage trajectory is generated on a typical human body surface model in surface coordinates. A target human body surface model is generated by adjusting its parameters to measurement results of a surface of a patient body. The patient body is placed in a posture close to a recommended posture and its surface is measured using a three-dimensional camera. The target human body surface model is further adjusted to the measured surface of the patient body. The massage trajectory is transferred from the surface coordinates into spatial coordinates, and a motion trajectory of a massage tool is calculated in coordinates of a robotic manipulator. Next, the patient body is massaged by moving the massage tool along the motion trajectory. The massage trajectory is re-calculated continuously to correct the motion trajectory when changing the position and posture of the patient body.

17 Claims, 8 Drawing Sheets

(56) References Cited

U.S. PATENT DOCUMENTS

2025/0228731 A1* 7/2025 Litman .................. B25J 9/0084
2025/0255772 A1* 8/2025 Akiona .................. B25J 9/1664

* cited by examiner

AUTOMATIC MASSAGE METHOD

FIELD OF THE INVENTION

The invention relates to the field of automated physio-therapy equipment and can be used for health-improving massage operations.

BACKGROUND OF THE INVENTION

There are methods and devices for performing automatic massage using a robotic manipulator (see the following patent documents: US20220388168 A1, published on 8 Dec. 2022; U.S. Pat. No. 20220388165 A1, published on 8 Dec. 2022; US20220134551 A1, published on 5 May 2022; U.S. Pat. No. 11,338,443 B2, published on 27 May 2021; US20220414291 A1, published on 29 Dec. 2022; RU 2785828 C1, published on 14 Dec. 2022).

More specifically, US20220134551 A1 discloses a method and device for performing automatic massage using a robotic manipulator, in which a massage plan consisting in providing trajectory retargeting is generated, an original body model is adjusted according to input data, and massage poses and an associated pressure force of the robotic manipulator are recorded in Cartesian space points.

The disadvantage of the method known from US20220134551 A1 is the inability to use a single massage program which can be applied to patients with a different body geometry in different positions and, at the same time, takes into account the anatomical features of the body geometry and position of a patient.

SUMMARY OF THE INVENTION

The objective and technical result of the invention are to create a single massage program that can be applied to patients with a different body geometry in different positions and, at the same time, takes into account the anatomical features of the body geometry and position of a patient with high accuracy.

The above-indicated objective and technical result are achieved by using an automatic massage method which comprises: generating a massage trajectory on a typical human body surface model in surface coordinates, generating a target human body surface model by adjusting (fitting) its parameters to the results of measuring a surface of a patient body, placing the patient body in a posture close to a recommended posture, measuring the surface of the patient body using a three-dimensional camera, adjusting a posture and spatial position of the target human body surface model to the measured surface of the patient body, transferring the massage trajectory from the surface coordinates of the target human body surface model into spatial coordinates, calculating a motion trajectory of a massage tool in coordinates of a robotic manipulator, and performing massage of the patient body by moving the massage tool of the robotic manipulator along the calculated motion trajectory. The steps of measuring the surface of the patient body using the three-dimensional camera, adjusting the posture and spatial position of the target human body surface model to the measured surface of the patient body, transferring the massage trajectory from the surface coordinates of the target human body surface model into the spatial coordinates, and calculating the motion trajectory of the massage tool in the coordinates of the robotic manipulator are performed continuously to correct the motion of the robotic manipulator when the position and posture of the patient change. The step of generating the massage trajectory on the typical human body surface model in the surface coordinates is performed by generating a surface having triangular faces, each vertex of which corresponds to a certain point of the body for all the model transformations.

The massage trajectory is generated on the typical human body surface model in the surface coordinates by using a unified 3D human body model configured as the surface formed by the triangular faces, with each vertex corresponding to a certain point of the body for all the model transformations (body geometry parameters that affect growth, chest depth, etc., as well as posture parameters: angles of flexion of the skeleton joints). As the unified 3D human body model, for example, an SMPL model can be used (see WO 2016/207311, published on 29 Dec. 2016). The trajectory is drawn along the surface along a curve formed by the intersection of a plane formed by a straight line connecting the current and next points of the trajectory and a normal to the surface at the current point of the trajectory, while the intersection is sought using analytical geometry methods.

The step of generating the target human body surface model by adjusting the parameters of the model geometry to the results of measuring the surface of the patient body is performed by creating a human body geometry model which will correspond to a set of measured human body parameters. For this, a regressor can be used, which is a trained system or a neural network, in particular, the Bodies-from-Measurements software, which allows one to determine the geometry parameters of the unified 3D human body model based on the measured parameters of the patient, such as height, chest depth, etc.

The patient body is placed in the posture close to the recommended one by generating a model having patient body geometry and posture parameters set by a specialist for this type of massage, as well as position and orientation parameters corresponding to the patient position on a massage couch.

By measuring the surface of the patient body using the 3D camera, it is possible to obtain a monochrome image in the infrared range. Additionally, for each pixel of the image, its coordinate is given in Cartesian coordinates with the origin of coordinates tied to the camera. The image has a surface formed from each frame of a video image by forming a face from each 3 adjacent pixels (dots). Thus, a cloud of surface points is measured, and the surface is built from the faces for the patient body.

The posture and spatial position of the target human body surface model are adjusted to the measured (by the 3D camera) surface of the patient body with the aid of optimization methods by minimizing a loss function which determines the difference between the surface model and the surface of the measured patient body.

The massage trajectory is transferred from the surface coordinates of the target human body surface model into the spatial coordinates by transferring each point of the trajectory by adding an origin vector of a face on which the point is located and a point vector in the coordinates of the face which is transformed by the analytical geometry method into the coordinate system of the three-dimensional camera.

The motion trajectory of the massage tool is calculated in the coordinates of the robotic manipulator using the analytical geometry methods, taking into account the scale, displacement and rotation of the coordinate system of the robotic manipulator relative to the coordinate system of the three-dimensional camera.

Next, the patient is massaged by moving the massage tool of the robotic manipulator along the calculated motion trajectory.

BRIEF DESCRIPTION OF THE DRAWINGS

Further, the invention is explained with reference to FIGS. 1-10, where.

Next, the essence of the invention will be explained in more detail with reference to FIGS. 1-10.

DETAILED DESCRIPTION OF THE INVENTION

Figure 1:
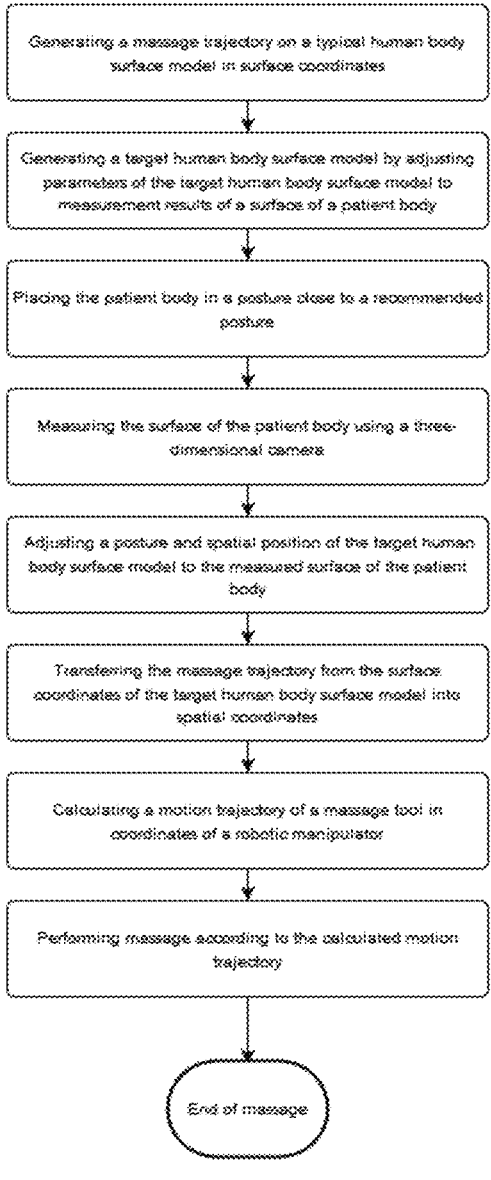
FIG. 1 shows a flowchart of an automatic massage method, in which a massage trajectory is calculated continuously to correct the motion of a robotic manipulator when changing the position and posture of a patient.

FIG. 1 shows a flowchart of an automatic massage method, in which a massage trajectory is calculated continuously to correct the motion of a robotic manipulator when changing the position and posture of a patient.

Figure 2:
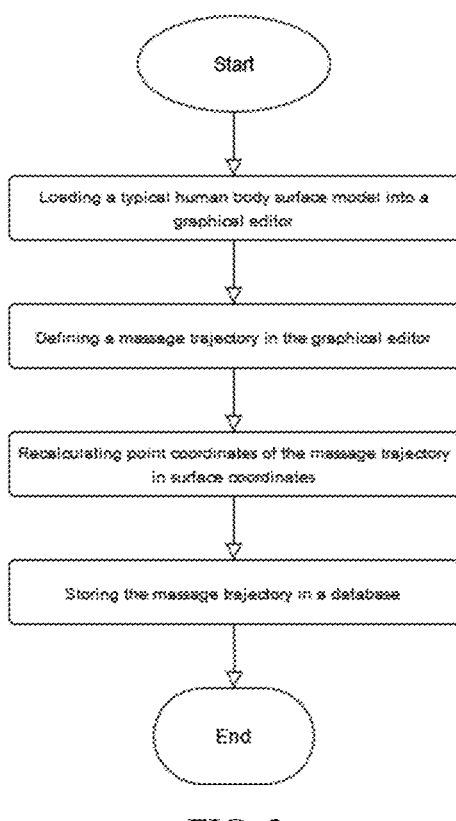
FIG. 2 shows a block diagram explaining how the massage trajectory is generated on a typical human body surface model in surface coordinates.

FIG. 2 shows a block diagram explaining how the massage trajectory is generated on a typical human body surface model in surface coordinates (not tied to a specific patient and can be performed in advance).

Figure 3:
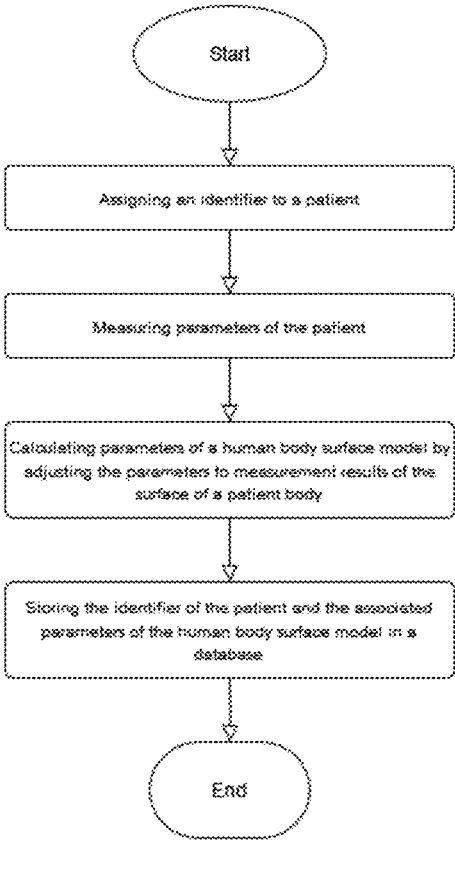
FIG. 3 shows a block diagram explaining how a target human body surface model is generated by adjusting its parameters to the results of measuring the surface of a patient body.

FIG. 3 shows a block diagram explaining how a target human body surface model is generated by adjusting its parameters to the results of measuring the surface of a patient body (not tied to a specific patient and can be performed in advance).

Figure 4:
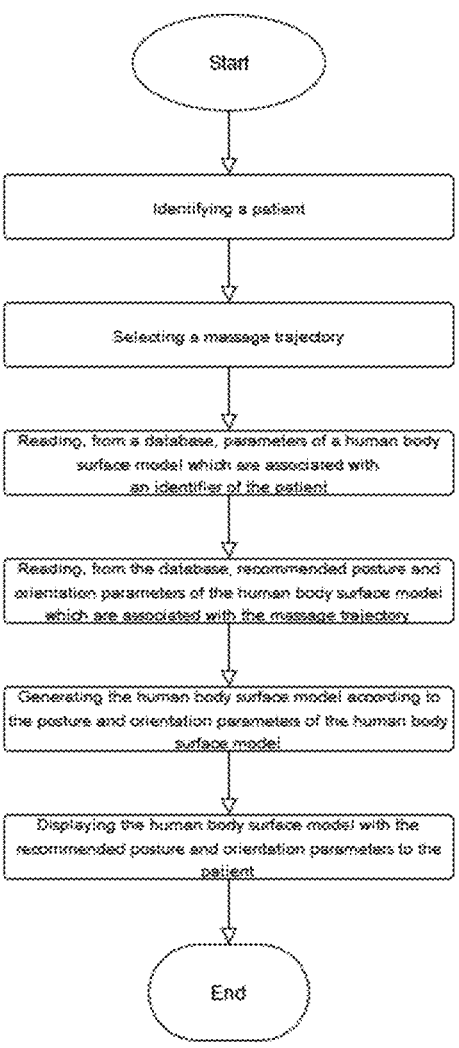
FIG. 4 shows a block diagram explaining how the patient is placed in a posture close to the recommended one.

FIG. 4 shows a block diagram explaining how the patient is placed in a posture close to the recommended one.

The recommended posture and orientation parameters can be set in a graphical editor and shown to the patient on the screen of a control device.

An alternative way could be to verbally describe the posture and voice it out, for example, as follows: "Lie straight on your stomach, relax, bend and place your arms near your head, and straighten your legs and spread them a little apart without leaving the couch".

Figure 5:
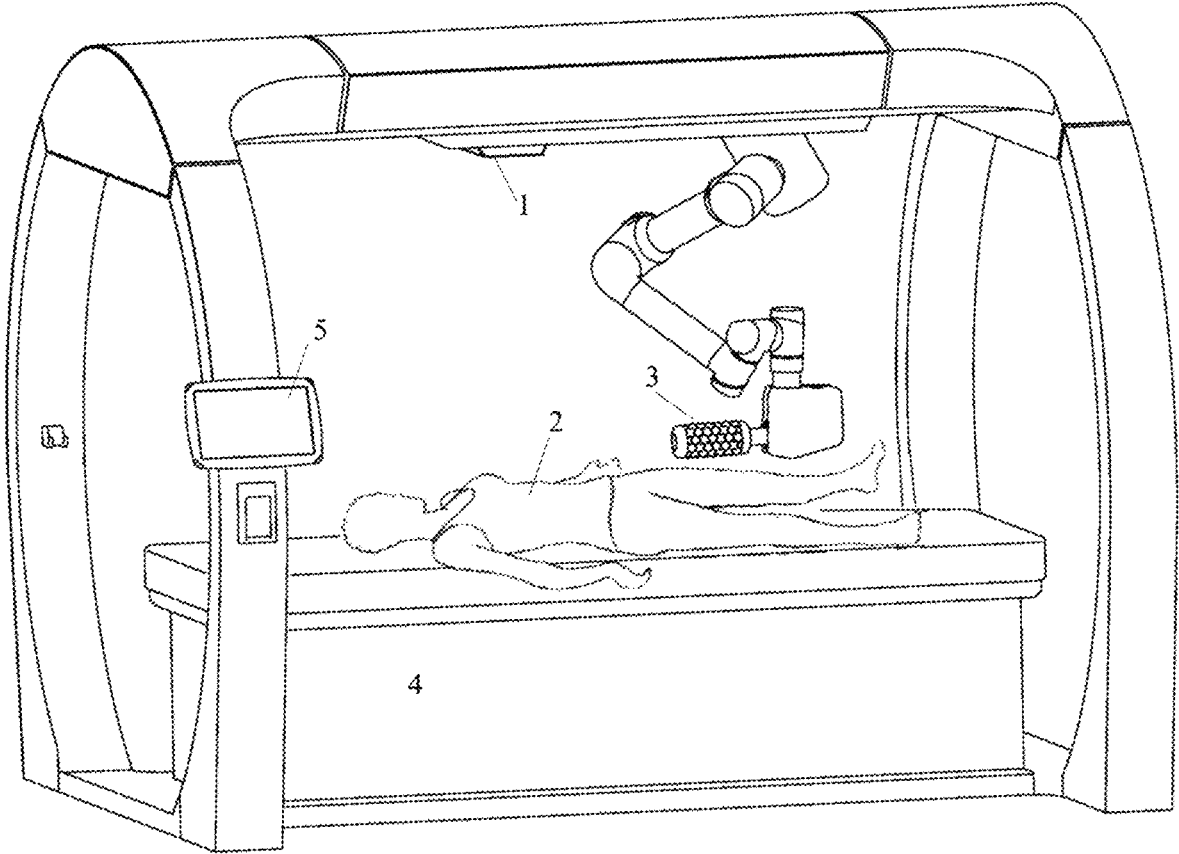
FIG. 5 shows a diagram of an automatic massage device.

FIG. 5 shows a diagram of an automatic massage device, in which:

1—3D camera,
2—patient,
3—massage tool,

4—couch cabinet with a computer,
5—interface (touch screen) for controlling the device.

A 3D camera captures not only X and Y values in an image, but also the depth values of a scene or object. The frame of a conventional camera is an array of pixels containing the color of the object being filmed, but the frame of the 3D camera is an array of coordinates of the object being filmed.

3D cameras are commercially available, see, for example, Basler blaze Time-of-Flight 3D Camera by Basler AG, addr. An der Strusbek 60-62, 22926, Ahrensburg, Germany, or 3D cameras of DCAM Series and DS Series by Vzense Technology, addr. no. 78 Keling Rd, High-tech Zone, Suzhou, Jiangsu, China. There are different types of 3D cameras applicable for this task.

Let's consider one of the 3D camera type-a time-of-flight camera (ToF camera), also known as time-of-flight sensor (ToF sensor). It is a range imaging camera system for measuring distances between the camera and a subject for each point of an image based on time-of-flight, the round trip time of an artificial light signal, as provided by a laser or an LED. Laser-based time-of-flight cameras are part of a broader class of scannerless LIDAR, in which the entire scene is captured with each laser pulse, as opposed to point-by-point with a laser beam such as in scanning LIDAR systems.

Figure 6:
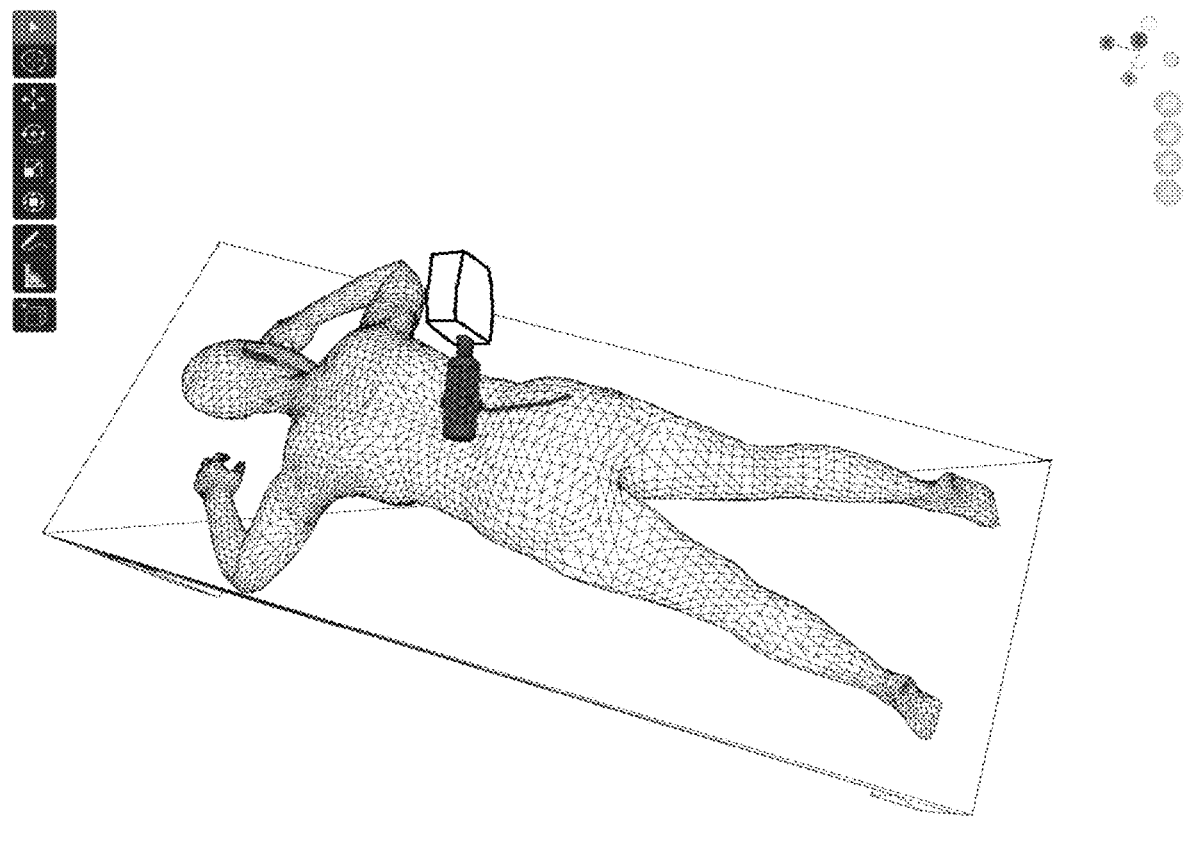
FIG. 6 shows a screenshot of a 3D editor, which shows the setting of the massage trajectory by a specialist.

FIG. 6 shows a screenshot of a 3D editor, which shows the setting of the massage trajectory by a specialist. The 3D editor allows one to set and edit points on the model surface and build and edit the trajectory using these points.

Also, the 3D editor allows one to set the massage parameters, namely:

the force of pressing a massage tool to the surface,
the type of the massage tool,
the intensity of the massage (for example, the speed of rotation of a massage drum),
the orientation of the massage tool relative to the normal to the surface of the model at the current point of the trajectory and the vector connecting the current and next points of the trajectory,
the speed of movement of the massage tool along the trajectory,
a rate of change in the orientation of the massage tool,
a maximum acceleration when moving the massage tool along the trajectory,
a maximum angular acceleration when changing the orientation of the massage tool.

The surface of the model is defined by a set of points in space, with each of the points corresponding to a certain point of the body and having its own identifier (for example, a number). The points are also combined into groups of 3 points that do not lie on one straight line and form faces. Each of such groups of points describes a flat face having a normal $\vec{N}$ determined by the order of points enumeration and can be given, for example, by the following vector product: $\vec{N}=\overrightarrow{AB}\times\overrightarrow{AC}$, where $\vec{A}$, $\vec{B}$, $\vec{C}$ are the radius vectors points of the selected group in three-dimensional spatial coordinates, and $\overrightarrow{AB}=\vec{B}-\vec{A}$ and $\overrightarrow{AC}=\vec{C}-\vec{A}$ are the corresponding vectors. Note that the surface can be defined in the same way as that used, for example, in the geometry description file format developed in Wavefront Technologies.obj. The cartesian coordinates of a 3D camera or a robotic manipulator can be used as three-dimensional spatial coordinates. Note that the cartesian coordinates of the 3D camera and the cartesian coordinates of the robot manipulator are interconnected by the affine transformations known from analytical geometry, in particular, by rotation and/or parallel translation.

The point of the massage motion trajectory on a typical human body surface model in surface coordinates can be recorded and stored in the barycentric coordinates of a triangular face and the identifier of the face on which it is set.

The re-calculation of each point of the massage trajectory from the surface coordinates using barycentric coordinates of the point on the triangular face of a target human body surface model into three-dimensional spatial coordinates can be performed using the following formula:

$$\vec{T} = \alpha\vec{A} + \beta\vec{B} + \gamma\vec{C},$$

where $\alpha$, $\beta$, $\gamma$ are the barycentric coordinates of the trajectory point on the face, and $\vec{A}$, $\vec{B}$, $\vec{C}$ are the radius vectors of the vertices of the triangular face on which the trajectory point lies in the three-dimensional spatial coordinates.

Note that the above-indicated three-dimensional spatial coordinates of the trajectory points can be converted into the coordinates of the robotic manipulator using the methods known in analytical geometry.

The specified massage trajectory with the above parameters can be saved as a file to a computer and then loaded back into the 3D editor for further editing.

The main idea of the inventive method is that each point and face of the model are located on a certain part of the human body surface. For example, the center of the navel of a body model is always located on a face with the same identifier (number), which is formed by three vertices with the same identifiers (numbers) for any changes in the parameters of the body geometry, posture and position of the model (within the limits of its applicability).

After the body geometry is calculated, that is, the model with the most suitable parameters is selected, the points of the trajectory of the massage tool are re-calculated from the coordinates on the surface of the model (where it is indicated on which triangular face the point is located and what barycentric coordinates it has on this face) into the spatial (cartesian) coordinates in which the analysis of a 3D image of a person has been carried out.

Normals to the surface of the model are also calculated for each point of the trajectory. Then, these normals are also re-calculated into the spatial (cartesian) coordinates in which the 3D image of the person has been analyzed.

After that, the above points of the trajectory and normals are re-calculated into the spatial coordinates of the robotic manipulator using the methods known from analytical geometry.

Figure 7:
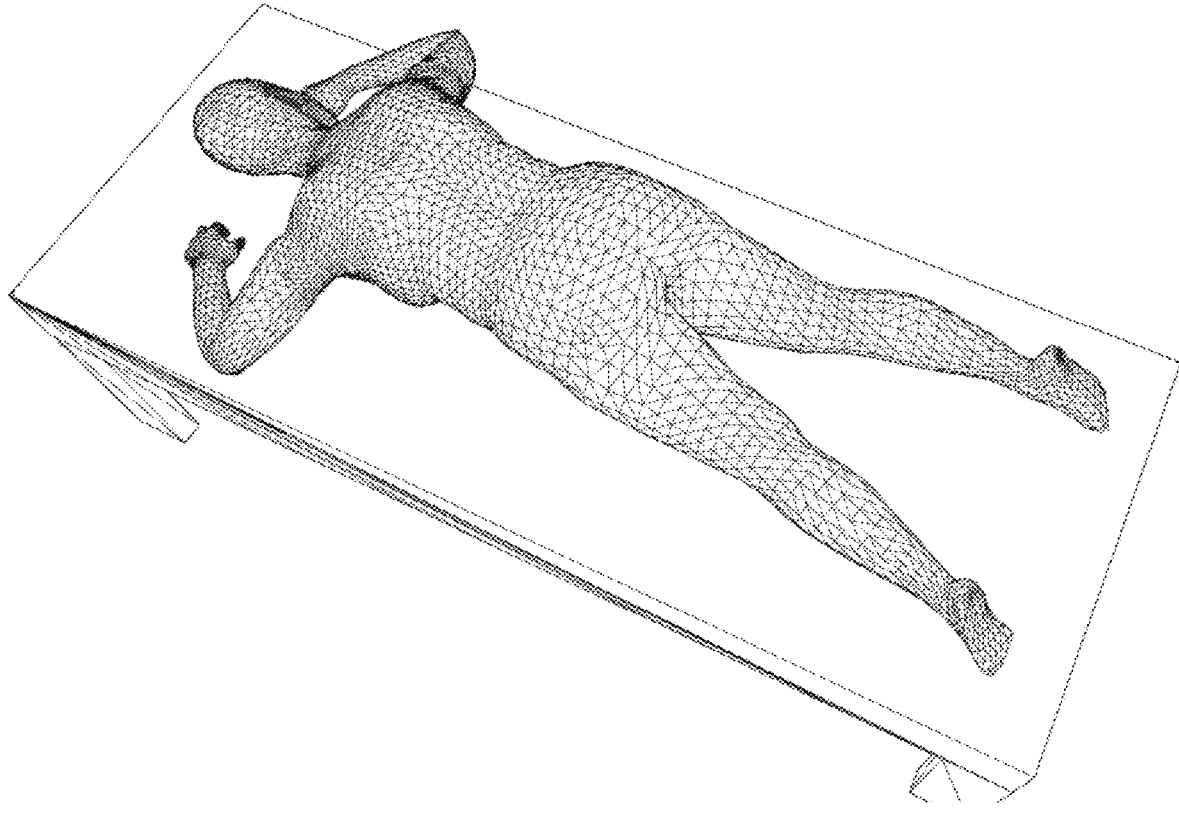
FIG. 7 shows an example of the generated model of the patient body placed in the posture close to the recommended one.

FIG. 7 shows an example of the generated model of a patient body placed in the posture close to the recommended one.

Figure 8:
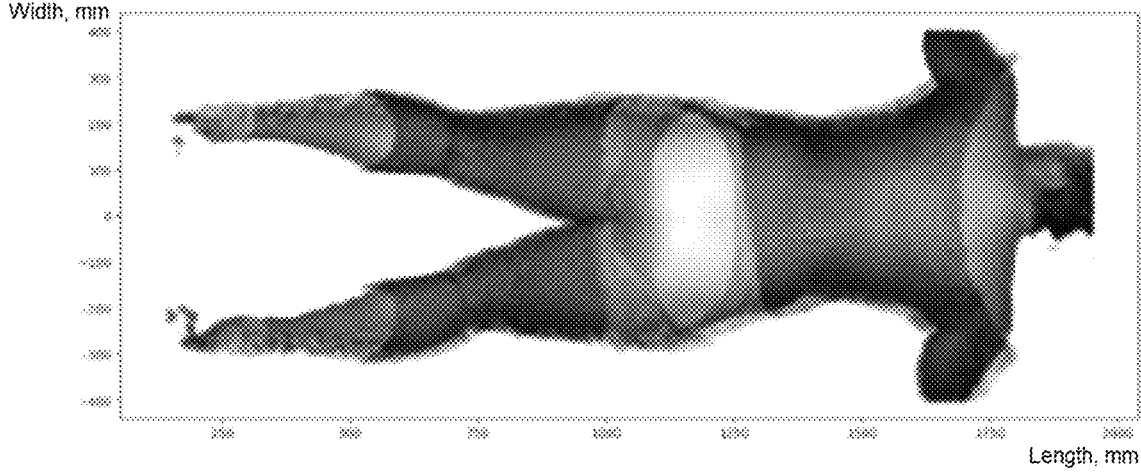
FIGS. 8, 9 show examples of measuring the surface of the patient body using a three-dimensional camera.
Figure 9:
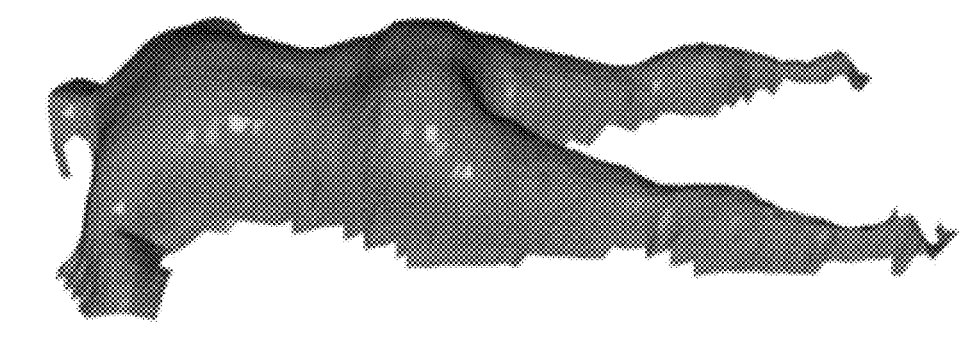

FIGS. 8, 9 show examples of measuring the surface of the patient body using the three-dimensional camera.

Figure 10:
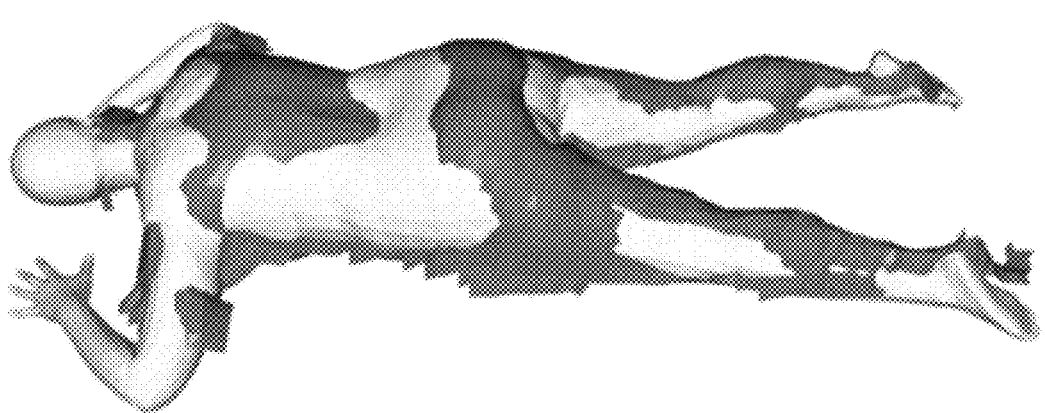
FIG. 10 shows an example of adjusting the posture and spatial position of the target human body surface model to the constructed surface of the patient body.

FIG. 10 shows an example of adjusting the posture and spatial position of the target human body surface model to the constructed surface of the patient body.

Since the generation of the massage trajectory on the typical human body surface model in the surface coordinates (e.g., like in a well-known UV mapping process) is carried out by constructing the surface with triangular faces, each vertex of which corresponds to a certain point of the body with all the model transformations, it is possible to achieve high accuracy of the body surface model and, accordingly, to generate the exact trajectory of the robot manipulator for massage.

Since the generation of the target human body surface model by adjusting (fitting) its parameters to the results of measuring the surface of the patient body is carried out using the regressor, it was possible to additionally achieve a high degree of accuracy due to the calculation of the geometry parameters by means of the regressor, which made it possible to generate the model with given dimensions.

Since the steps of measuring the surface of the patient body using the three-dimensional camera, adjusting the posture and spatial position of the target human body surface model to the measured surface of the patient body, transferring the massage trajectory from the surface coordinates of the target human body surface model into the spatial coordinates, and calculating the motion trajectory of the massage tool in the coordinates of the robot manipulator are performed continuously to correct the motion of the robot manipulator when the patient position and posture change, the motion of the robot manipulator is constantly corrected, which makes it possible to increase the accuracy of the impact of the massage tool on the human body of any geometry in various postures without making changes in a single program massage.

Since the patient body was placed in the posture close to the recommended one, it was possible to simplify the adjustment of the posture and spatial position of the target human body surface model to the measured surface of the patient body, and, consequently, to increase the accuracy of the trajectory of the robotic manipulator for massage.

Comparative empirical tests of the inventive method with the method known from U.S. Pat. No. 20220134551 A1 have showed that the data error peculiar to the inventive method does not exceed 3 cm, which makes it possible to avoid splitting a single massage program for different patients according to their body geometry in different postures, taking into account the anatomical features of the body geometry and posture of each patient.

The inventive method is carried out as follows (implementation example).

The massage trajectory is generated on the typical human body surface model in the surface coordinates, e.g., by using the UV mapping process. The target human body surface model is generated using the regressor by adjusting its parameters to the results of measuring the surface of the patient body, and the patient body is placed in the posture close to the recommended one. Further, to correct the movement of the robot manipulator when the patient position and posture change, the steps of measuring the surface of the patient body using the three-dimensional camera, adjusting the posture and spatial position of the target human body surface model to the measured surface of the patient body, transferring the massage trajectory from the surface coordinates of the target human body surface model into the spatial coordinates, and calculating the motion trajectory of the massage tool in the coordinates of the robotic manipulator are performed continuously. Then, the patient is massaged by moving the massage tool of the robotic manipulator along the calculated trajectory.

Thus, the invention has been fully and completely described, thereby allowing the ones skilled in the art to implement it, as well as industrially apply it.

The invention claimed is:

1. An automatic massage method comprising the steps of:
   i. generating a continuous massage trajectory on a predefined human body surface model in barycentric surface coordinates;
   ii. generating a target human body surface model based on inputted or measured parameters of a patient body;
   iii. placing the patient body in a posture close to a recommended posture;
   iv. measuring the surface of the patient body using a three-dimensional camera;
   v. adjusting a posture and spatial position of the target human body surface model to the measured surface of the patient body;
   vi. transferring the continuous massage trajectory from the barycentric surface coordinates of the target human body surface model into spatial coordinates;
   vii. calculating a continuous motion trajectory of a massage tool in coordinates of a robotic manipulator; and
   viii. performing massage of the patient body by moving the massage tool of the robotic manipulator along the calculated continuous motion trajectory;
   wherein the robotic manipulator automatically performs steps (ii)-(viii),
   wherein the steps of measuring the surface of the patient body using the three dimensional camera, adjusting the posture and spatial position of the target human body surface model to the measured surface of the patient body, transferring the continuous massage trajectory from the barycentric surface coordinates of the target human body surface model into the spatial coordinates, and calculating the continuous motion trajectory of the massage tool in the coordinates of the robotic manipulator are performed continuously to correct a motion of the robotic manipulator when the position and posture of the patient change; and
   wherein the step of generating the continuous massage trajectory on the predefined human body surface model in the barycentric surface coordinates is performed by generating a surface having triangular faces, each vertex of which corresponds to a certain point of the body for all model transformations.

2. The method of claim 1, wherein the parameters include height and/or chest depth.

3. The method of claim 1, wherein the continuous massage trajectory includes varying a force applied to the patient body.

4. The method of claim 1, wherein the continuous massage trajectory includes varying a speed of rotation of the massage tool.

5. The method of claim 1, wherein the continuous massage trajectory includes varying a speed of motion along the continuous massage trajectory.

6. The method of claim 1, wherein the continuous massage trajectory includes varying an orientation of the massage tool relative to a normal of the surface of the patient body.

7. The method of claim 1, wherein the continuous massage trajectory includes varying an acceleration of motion along the continuous massage trajectory.

8. The method of claim 1, wherein the continuous massage trajectory includes varying an angular acceleration of motion along the continuous massage trajectory.

9. The method of claim 1, wherein the three dimensional camera is a time of flight camera.

10. The method of claim 1, wherein the step of generating the continuous massage trajectory uses a 3D editor for setting and editing points on the model surface, for building and editing the continuous massage trajectory, and for setting massage parameters.

11. An automatic massage method comprising the steps of:
   i. generating a continuous massage trajectory on a predefined human body surface model in barycentric surface coordinates;
   ii. generating a target human body surface model based on measured parameters of a patient body;
   iii measuring a surface of the patient body using a three-dimensional camera;
   iv. adjusting the target human body surface model based on the measured surface of the patient body;
   V. converting the continuous massage trajectory model from the barycentric surface coordinates on the adjusted target human body surface into spatial coordinates;
   vi. calculating a continuous motion trajectory of a massage tool of a massage robot in the spatial coordinates; and
   vii. moving the massage tool along the calculated continuous motion trajectory;
   wherein the massage robot automatically performs steps (ii)-(vii);
   wherein coordinates of the massage tool are adjusted continuously when a position or a posture of the patient body changes; and
   wherein the step of generating the continuous massage trajectory uses a surface having triangular faces, each vertex of which corresponds to a certain point of the patient body.

12. The method of claim 11, wherein the parameters include height and/or chest depth.

13. The method of claim 11, wherein the continuous massage trajectory includes varying any of (a) a force applied to the patient body by the massage tool, (b) a speed of rotation of the massage tool, (c) a speed of motion of the massage tool along the continuous massage trajectory, (d) an orientation of the massage tool relative to a normal of the surface of the patient body, (e) an acceleration of motion along the continuous massage trajectory, and (f) an angular acceleration of motion of the massage tool along the continuous massage trajectory.

14. A robot for performing automatic massage, comprising:
   a massage tool coupled to a controller, the controller configured to
   i. generate a continuous massage trajectory on a predefined human body surface model in barycentric surface coordinates;
   ii. generate a target human body surface model based on inputted or measured parameters of a patient body;
   iii. measure a surface of the patient body using a three-dimensional camera;
   iv. adjust the target human body surface model to the measured surface of the patient body and based on the parameters;
   v. convert the continuous massage trajectory from the barycentric surface coordinates into spatial coordinates;
   vi. calculate a continuous motion trajectory of the massage tool in the spatial coordinates; and
   vii. move the massage tool along the calculated continuous motion trajectory;

the controller configured to automatically perform (ii)-(vii), wherein a motion of the massage tool is adjusted automatically when a position and/or a posture of the patient body changes; and wherein the generating of the continuous massage trajectory includes generating a surface having triangular faces, each vertex of which corresponds to a certain point of the patient body.

15. An automatic massage method comprising the steps of:

i. generating a continuous massage trajectory on a predefined human body surface model;

ii. generating a target body surface model from the predefined human body surface model based on measured parameters of a patient body;

iii. measuring a surface of the patient body using a three-dimensional camera;

iv. adjusting the target body surface model to the measured surface;

v. calculating a continuous motion trajectory of a massage tool of a massage robot on the adjusted target body surface model; and vi. moving the massage tool along the calculated continuous motion trajectory, the massage robot automatically performing steps (ii)-(vi).

16. The method of claim 15, wherein the human body surface model uses a barycentric coordinate system, and wherein the calculating step uses a surface having triangular faces, each vertex of which corresponds to a certain point of the patient body.

17. A robot for performing automatic massage, comprising:

a massage tool coupled to a controller, the controller configured to i. generate a continuous massage trajectory on a predefined human body surface model;

ii. generate a target body surface model from the predefined human body surface model based on measured parameters of a patient body;

iii. measure a surface of the patient body using a three-dimensional camera;

iv. adjust the target body surface model to the measured surface;

v. calculate a continuous motion trajectory of a massage tool on the adjusted target body surface model; and vi. move the massage tool along the calculated continuous motion trajectory, the controller configured to automatically perform (ii)-(vi).

* * * * *